(No Model.)

M. V. MULLEN.
SIDE BEARING FOR CAR TRUCKS.

No. 468,057. Patented Feb. 2, 1892.

Witnesses

Inventor
Mellville V. Mullen
By Raymond & Veeder
Atty's

UNITED STATES PATENT OFFICE.

MELLVILLE V. MULLEN, OF CHICAGO, ILLINOIS, ASSIGNOR OF ONE-HALF TO R. G. CHASE, OF SAME PLACE.

SIDE BEARING FOR CAR-TRUCKS.

SPECIFICATION forming part of Letters Patent No. 468,057, dated February 2, 1892.

Application filed September 30, 1891. Serial No. 407,252. (No model.)

*To all whom it may concern:*

Be it known that I, MELLVILLE V. MULLEN, residing in Chicago, Illinois, have invented certain new and useful Improvements in Side Bearings for Car-Trucks, of which the following is a specification.

The object of my invention is to provide an easy-working side bearing for car-trucks which will allow them to maintain their alignment with the track easily under all circumstances, at the same time avoiding the liability to rapid wear and destruction which usually exists in anti-friction side bearings.

It is well known that excessive strain is put upon the truck and undue wear of the wheel-flanges and of the track is caused by the use of the ordinary side bearings having sliding faces. To obviate this, various forms of anti-friction bearings have been proposed, such as balls or loose rollers working in grooved faces of the bearing-plates attached to the under part of the car-frame and the top of the truck, respectively, or such as rolls mounted on trunnions or pivots. It is a frequent occurrence that for a considerable time no swiveling movement of the truck takes place, although the car is in full motion. In such a case it happens that, when a loose ball or roller bearing is used, the balls or rollers under the influence of the jar to which they are subjected settle at one end of the groove or path in which they travel. In this position they are incapable of free movement when the truck shifts, the result being that flat spots are worn upon them, so that they cease to act in the manner intended. Side bearings employing pivots or trunnions are subject to rapid wear, which soon renders them inefficient and finally destroys them, for the reason that they are not easily accessible, and are therefore never lubricated.

My invention is intended to avoid these objections and to provide an anti-friction bearing which cannot become displaced under the jar of travel and cannot become worn flat and in which no lubrication is required.

Figure 1:
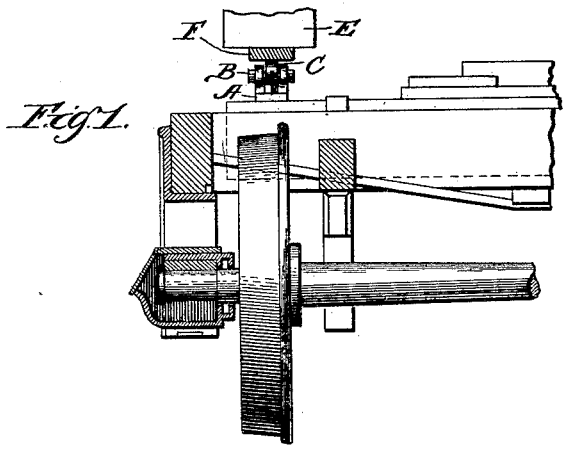
Figure 2:
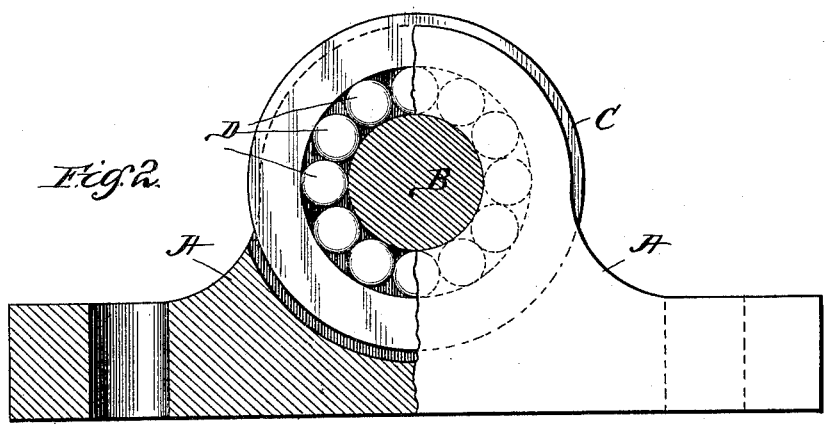
Figure 3:
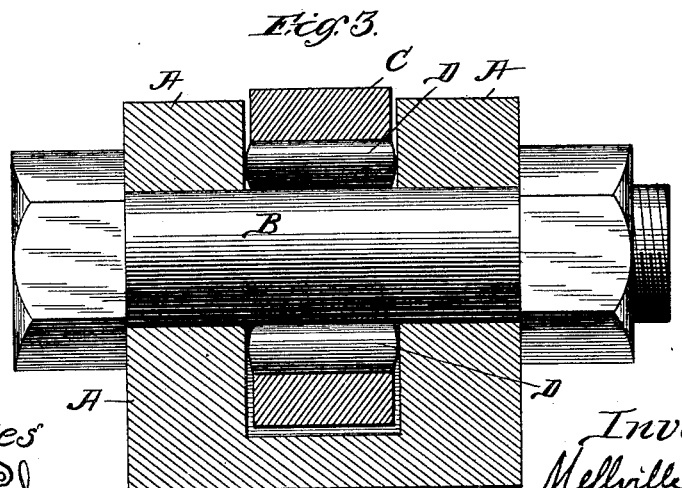

In the accompanying drawings, Figure 1 is a side view, partly in section, of one side of a car-truck made in accordance with my improvement. Fig. 2 is a side view, partly in section, of the bearing detached. Fig. 3 is a vertical cross-section of the same.

A is a base of cast or malleable metal having upwardly-projecting jaws, through which a pin B passes, said pin being preferably case-hardened. Surrounding the pin B is a ring C. Interposed between the ring C and the pin B is a series of rollers D, which fill the annular space between the ring and pin. Only enough space is left between the rollers to permit them to revolve without grinding upon each other.

E is a timber of the car-floor, having a suitable bearing-plate F in contact with the ring C.

It makes no difference whether the base A is fastened to the car-truck and the plate F to the timber or whether their respective positions are reversed.

What I claim is—

The combination, with a car-truck, of a side bearing consisting of a base, a pin supported therein, a ring surrounding said pin, and a series of rollers interposed between said pin and ring, substantially as described.

MELLVILLE V. MULLEN.

Witnesses:
 IRWIN VEEDER,
 TODD MASON.